Sept. 30, 1969 M. L. BOURGET ET AL 3,469,341
TRANSPLANTING PLANTS
Filed May 31, 1967
FIG. 1
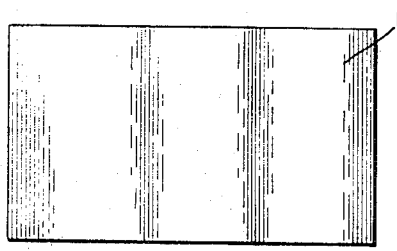
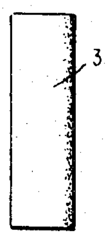
FIG. 2
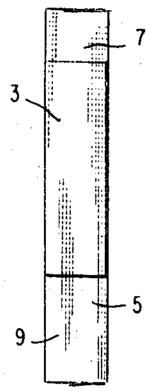
FIG. 3
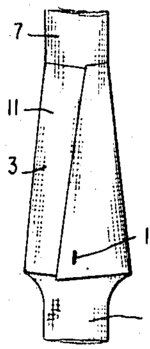
FIG. 4
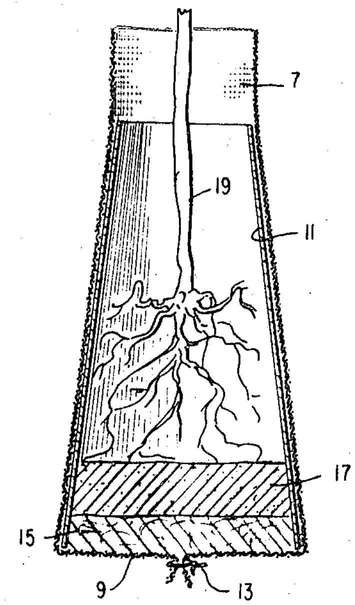
FIG. 5
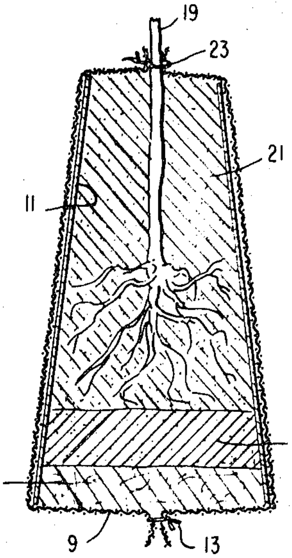
FIG. 6
INVENTORS
MAURICE L. BOURGET
ANDRÉ P. GESNEL
JOSEPH A. L. ORARD
BY Young + Thompson
ATTORNEYS United States Patent Office 3,469,341
Patented Sept. 30, 1969

3,469,341
TRANSPLANTING PLANTS

Maurice Louis Bourget, 2 Rue Lafontaine, 26 Valence, France, André Paul Gesnel, 21 Rue Pierre Dupont, 69 Collonges-au-Mont-d'Or, France; and Joseph Antoine Louis Orard, Route Nationale, 38 Feyzin, France Filed May 31, 1967, Ser. No. 642,462
Claims priority, application France, June 2, 1966, 47,359
Int. Cl. A01c *11/04*
U.S. Cl. 47—37 1 Claim

ABSTRACT OF THE DISCLOSURE

Plants are transplanted by uprooting them, packing the roots in an inert particulate soilless carrier, and encasing the carrier in a perforated shell. Preferably, a sheet of cardboard or the like is formed as a truncated cone within a perforated net sleeve of plastic threads, with the ends of the sleeve gathered and fastened. The plant stem extends out of the small end of the truncated cone and the particulate carrier is prevented from escaping from the large end of the cone by a layer of wood fibers.

The present invention relates to methods and products for transplanting plants out of season and is particularly useful in connection with rose bushes and other shrubs.

The best time to transplant perennial plants is when their growth has stopped, that is, from autumn until the end of winter. However, in nurseries and other commercial operations, it is necessary to transplant plants during the peak commercial seasons, that is, from the beginning of November to the middle of December, and from the middle of February to the end of April. In fact, most of commercial transplanting takes place during the latter period.

However, the period from the middle of February to the end of April is actually the worst period to transplant, because the plants are awaking from the winer and growth is resuming. Rooting plants up at this time and transplanting them often kills them, regardless of whether the roots are kept damp.

Accordingly, it is an object of the present invention to provide methods for transplanting plants, which will be independent of the season in which the plants are transplanted.

Another object of the present invention is the provision of a method for transplanting plants, by which the plants may be stored longer between digging up and replanting, without damage to the plant.

Another object of the present invention is the provision of a packaged plant which is readily transplantable and/or storable.

Other objects and advantages of the present invention will become apparent from the following description, taken in connection with the accompanying drawing, in which the figures show sequential steps in the packaging of a plant according to the invention, FIGS. 1–4 being elevational views and FIGS. 5 and 6 being cross-sectional views.

Briefly, the invention is the discovery that plants may be successfully transplanted, if as soon as they are rooted up, the roots are immediately put into a neutral or inert particulate carrier inside which the growth of the roots and thus the growth of the plants can continue, as in known methods of growing plants without soil. The carrier is surrounded by a perforated enclosure which enables the whole package, on being replanted in the soil, to be set out as a whole without change, so that the plant can grow through the perforated shell and continue to grow in the soil of the ground.

Thus, the plant can be rooted up at any season of the year and can be kept a year or more in the package without damage, so that it can be transplanted at any time of the year. If it is transplanted at a growing season, it will immediately resume growing in the soil. Thus, nurseries and other commercial institutions can root up plants at any convenient season and store them and sell them at peak seasons thereby regulating their business at will.

Moreover, the packaged plants can be forced into hibernation, by being stored at low temperatures (from 2° to 10° C.) under diffused light or even in the dark. Under such conditions, the roots alone grow in the soilless cultivation medium, while the growth of the exposed or aerial portion of the plant is greatly reduced.

If desired, in addition to the root-pervious wrapping, an imperforate liner of cardboard or other decomposable material may be provided. This liner is also root pervious, in the sense that it rapidly decomposes in contact with ground water, so that the roots can pass easily through it.

By way of example, the formation of a particular package according to the present invention will be described, as follows:

In FIG. 1 there is shown a sheet 1 of corrugated cardboard, for example, 20 x 35 cm. in extent and rectangular and having the corrugations parallel to the shorter dimension. As a first step, the sheet 1 is rolled up into a hollow cylinder 3, whose diameter is, say, 5 to 6 cm. and whose length of course is 20 cm. The corrugations are on the inside. Cylinder 3 is then inserted in a tubular sleeve 5 of plastic threads, which may be woven or extruded or formed by other processes, but which in any event provides a foraminous wall that is pervious to the roots of the plant. One end 7 of sleeve 5 extends a relatively short distance beyond the end of cylinder 3, for example 5 cm., while the other end 9 of sleeve 5 extends a relatively longer distance beyond the associated end of sleeve 5, for example, 10 cm.

The end of cylinder 3 adjacent the end 9 of sleeve 5 is then expanded outwardly, as seen in FIG. 4, until the ends of sheet 1 overlap each other only a relatively short distance, for example, 2 cm. The ends of sheet 1 in this expanded region are then secured together by a fastener such as a staple 10. In this position, sheet 1 has assumed the configuration of a cone 11.

The large end of cone 11 thus stretches end 9 of sleeve 5; and end 9 of sleeve 5 is then brought together from the FIG. 4 position to the FIG. 5 position, that is, the end 9 is gathered into a central bundle; and a fastener 13 is then secured about end 9 so that it is substantially coplanar with the large end of cone 11. The bottom of the package is thus formed.

On this bottom of the package, provided by the gathered and secured end 9, is disposed a layer of material which will not pass through the openings in mesh or net sleeve 5, but which at the same time will be water pervious. A suitable such material is wood fibers, which may be deposited in a layer 15 of a thickness of, for example, 1 cm. On top of layer 15 is then applied a thicker layer 17 of a particulate soilless material which will provide a neutral carrier in which soilless growth of a plant can be continued. Suitable examples of this material are washed sand, fine clinker, pumice, vermiculite, peat, and the like. The layer 15 keeps the layer 17 from being lost through the plastic mesh.

On top of this layer 17 are placed the roots of the plant 19, substantially free from soil. There is then filled in about these roots, to the top of the container, a body 21 which may be of the same material as the layer 17. In the illustrated embodiment, layers 17 and 21 are washed sand. In this position, which is the step between FIGS. 5 and 6, the package is open at the top, and the top of the package is, for example, 7 or 8 cm. in diameter.

When filling with the body 21 of particulate material is complete, the end 7 of sleeve 5 is then gathered about the trunk or stem of the plant, and a fastener 23 is applied thereabout, such as a rubber band or metal clip or the like. After this, the whole package is humidified by dipping it into an aqueous solution of plant food, which may be any of those commonly used in this art for soilless cultivation.

Finally, the packaged plant is placed in a bag (not shown) which may for example be of plastic foil, whose neck is then tightened about the trunk or stem of the plant by means of a fastener such as a rubber band or metal clip. The function of this bag is to reduce evaporation of the water in the package, without hermetically sealing the package, because the bag is not tightly secured about the package.

To replant the packaged plant, it is necessary only to remove the plastic bag and place the entire remaining package, including the fastened sleeve 5, in a prepared hole in the ground. The dirt is then filled in about the package and the freshly replanted plant is watered copiously, as in the case of any other transplanting. Growth continues unabated in the ground.

In view of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. For example, the cardboard may be more or less rigid, and may be provided with tiny perforations if desired. The cardboard sheet 1 may also be omitted, by using a plastic net which is close meshed so that the particulate carrier cannot pass therethrough. These and other modifications and variations are considered to be within the purview and scope of the present invention, as defined by the appended claim.

Having described our invention, we claim:

1. A packaged plant having a quantity of particulate soilless carrier in which its roots are embedded, a foraminous shell enclosing the carrier and the roots, said shell being pervious to the roots, a decomposable imperforate liner lining the shell and disposed between the carrier and the shell, said liner comprising a sheet of material in the shape of a truncated cone, the ends of said shell extending beyond the ends of the cone, the plant having a stem that extends out the small end of the truncated cone, the shell being gathered about the stem of the plant at the small end of the truncated cone, the large end of the cone being closed by a fastened end of the shell, a layer of fibrous material, the fibers being larger than the perforations of said shell and being disposed between said fastened end of the shell and said particulate carrier, and plant food dispersed throughout said carrier.

References Cited

UNITED STATES PATENTS

| | | | |
|---|---|---|---|
| 1,775,837 | 9/1930 | Wedge | 47—37 |
| 1,988,307 | 1/1935 | Fay. | |
| 2,600,300 | 6/1952 | Katz | 47—37 |
| 2,757,841 | 8/1956 | Chapman | 47—37 X |
| 3,080,680 | 3/1963 | Reynolds et al. | 47—37 |
| 3,375,607 | 4/1968 | Melvold | 47—37 |

FOREIGN PATENTS

| | | |
|---|---|---|
| 353,896 | 5/1922 | Germany. |
| 572,652 | 2/1958 | Italy. |

ROBERT E. BAGWILL, Primary Examiner